(12) United States Patent
Frehse et al.

(10) Patent No.: US 12,519,869 B1
(45) Date of Patent: Jan. 6, 2026

(54) PUBLISH/SUBSCRIBE MESSAGING SYSTEM CLIENT AND DATA BROKER, AND SERVICE CLIENT

(71) Applicant: HiveMQ GmbH, Landshut (DE)

(72) Inventors: Stefan Frehse, Bremen (DE); Markus Scully, Dublin (IE); Till Seeberger, Landshut (DE)

(73) Assignee: HiveMQ GmbH, Landshut (DE)

( * ) Notice: Subject to any disclaimer, the term of this patent is extended or adjusted under 35 U.S.C. 154(b) by 0 days.

(21) Appl. No.: 19/056,386

(22) Filed: Feb. 18, 2025

(51) Int. Cl.
*G06F 15/16* (2006.01)
*H04L 51/04* (2022.01)
*H04L 67/55* (2022.01)

(52) U.S. Cl.
CPC ............. *H04L 67/55* (2022.05); *H04L 51/04* (2013.01)

(58) Field of Classification Search
CPC ................................ H04L 67/55; H04L 51/04
See application file for complete search history.

(56) References Cited

U.S. PATENT DOCUMENTS

| | | | |
|---|---|---|---|
| 6,154,781 A | 11/2000 | Bolom et al. | |
| 6,334,151 B1 | 12/2001 | Bolom et al. | |
| 7,437,417 B2 | 10/2008 | Reynolds et al. | |
| 7,523,198 B2 | 4/2009 | Wu | |
| 7,882,253 B2 | 2/2011 | Pardo-Castellote et al. | |
| 8,738,704 B2 | 5/2014 | Stark et al. | |
| 8,850,013 B2 | 9/2014 | Waldman | |
| 9,614,914 B2 | 4/2017 | Van De Poel | |
| 11,362,846 B1 | 6/2022 | Head et al. | |
| 11,477,303 B1* | 10/2022 | Abdelwahab | H04L 5/0055 |
| 12,010,091 B2* | 6/2024 | Nalluri | H04L 67/12 |
| 2007/0038610 A1 | 2/2007 | Omoigui | |
| 2007/0143442 A1 | 6/2007 | Zhang et al. | |
| 2010/0179996 A1 | 7/2010 | Jones | |
| 2011/0307603 A1 | 12/2011 | Ishikawa | |
| 2012/0290656 A1 | 11/2012 | Jellard | |
| 2013/0337822 A1 | 12/2013 | Rubin et al. | |
| 2016/0269275 A1 | 9/2016 | Garcia-Luna-Aceves | |
| 2018/0167476 A1 | 6/2018 | Hoffner | |

(Continued)

FOREIGN PATENT DOCUMENTS

| | | |
|---|---|---|
| CN | 104657408 A | 5/2015 |
| CN | 115766318 A | 3/2023 |

OTHER PUBLICATIONS

LA-MQTT: Location-aware Publish-subscribe Communications for the Internet of Things Published Jul. 2022.

(Continued)

*Primary Examiner* — John B Walsh
(74) *Attorney, Agent, or Firm* — EIP US LLP

(57) ABSTRACT

A method performed at a data broker in a publish/subscribe messaging system, the method comprising establishing, in accordance with a publish/subscribe messaging protocol, a respective connection with each of one or more publish/subscribe messaging clients, after the establishing, receiving at the data broker system from a system client a deployment instruction instructing the data broker system to deploy a behavior model for modifying an operation of the data broker system, and in response to receiving the deployment instruction, processing control packets received at the data broker from the one or more publish/subscribe messaging clients in accordance with the behavior model.

20 Claims, 6 Drawing Sheets

(56) References Cited

U.S. PATENT DOCUMENTS

| | | |
|---|---|---|
| 2018/0189303 A1 | 7/2018 | Mankovskii |
| 2019/0026942 A1 | 1/2019 | Zhang |
| 2020/0021669 A1 | 1/2020 | Bikumala |
| 2020/0177461 A1* | 6/2020 | Zhu .................... G06F 16/2455 |
| 2020/0186431 A1 | 6/2020 | Chamarajnager |
| 2020/0195740 A1 | 6/2020 | Xu |
| 2025/0007981 A1 | 1/2025 | Virgen |

OTHER PUBLICATIONS

What's New in HiveMQ, https://www.hivemq.com/changelog/whats-new-in-hivemq-4-20/ Sep. 25, 2023.
The Rule Engine, EMQX Enterprise, https://docs.emqx.com/en/emqx/latest/data-integration/rules.html, Jan. 1, 2025.
The Pipeline, Highbyte, https://archive.guide.highbyte.com/configuration/pipeline/ Jan. 1, 2025.
U.S. Appl. No. 18/669,387.
Final Office Action dated Aug. 20, 2025 for U.S. Appl. No. 19/056,372.

* cited by examiner

PUBLISH/SUBSCRIBE MESSAGING SYSTEM CLIENT AND DATA BROKER, AND SERVICE CLIENT

BACKGROUND OF THE INVENTION

Field of the Invention

The present disclosure relates to the operation of a data broker in a publish/subscribe messaging system and of a system client of the data broker.

Description of the Related Technology

In order to coordinate the communication of data, in the form of messages, between numerous data sources and entities which make use of that data, a data broker may act as an intermediary by maintaining a record of subscriber clients who wish to receive data transmitted by publisher clients (which may be, for example, sensor data generated at a remote device). The use of a data broker can produce a faster and more efficient communication system, by eliminating the need for direct communication between the publisher and subscriber clients.

A feature of a publish/subscribe architecture is that a publisher client may not be aware of the identity, or even existence, of any subscriber client which has established a connection for its published data. Publisher clients may be remote, connected by low capacity data links, have limited access to power, and/or may be connected to the data broker only intermittently. Publisher clients may operate in a manner (such as, according to protocols or software) which cannot be modified after manufacture or after deployment. For publisher clients whose behavior can be subsequently modified, the scope and possibility for such modifications may be restricted. For example, a sensor device which connects to the data broker via a low bandwidth wireless communication link (for example, one using a 3GPP-specified protocol for internet-of-things, IoT, communications) may not be able to receive or process commands to modify its behavior. As another example, messages comprising sensor data generated by sensors on vehicles may be generated and published according to software which can only be updated when a vehicle is physically connected to a mechanic's computer system. Thus, it may not be possible to change dynamically the behavior of the publisher clients.

A data broker may operate in accordance with a standard applicable to the publish/subscribe system, and its behavior with respect to clients may be irrespective of an identity or type of client. A data broker may be operated by a publish/subscribe system operator and may connect client devices associated with different customers of the publish/subscribe system operator.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Examples of the present disclosure relate to processing messages received at a data broker in a publish/subscribe system. In particular, examples described herein can address problems related to undesired or unexpected behavior of publisher clients or can provide an otherwise improved data broker and publish/subscribe system. Examples described herein can provide a more flexible data broker system whose behavior can be adapted dynamically and without needing to interrupt ongoing processing at the data broker system.

Figure 1:
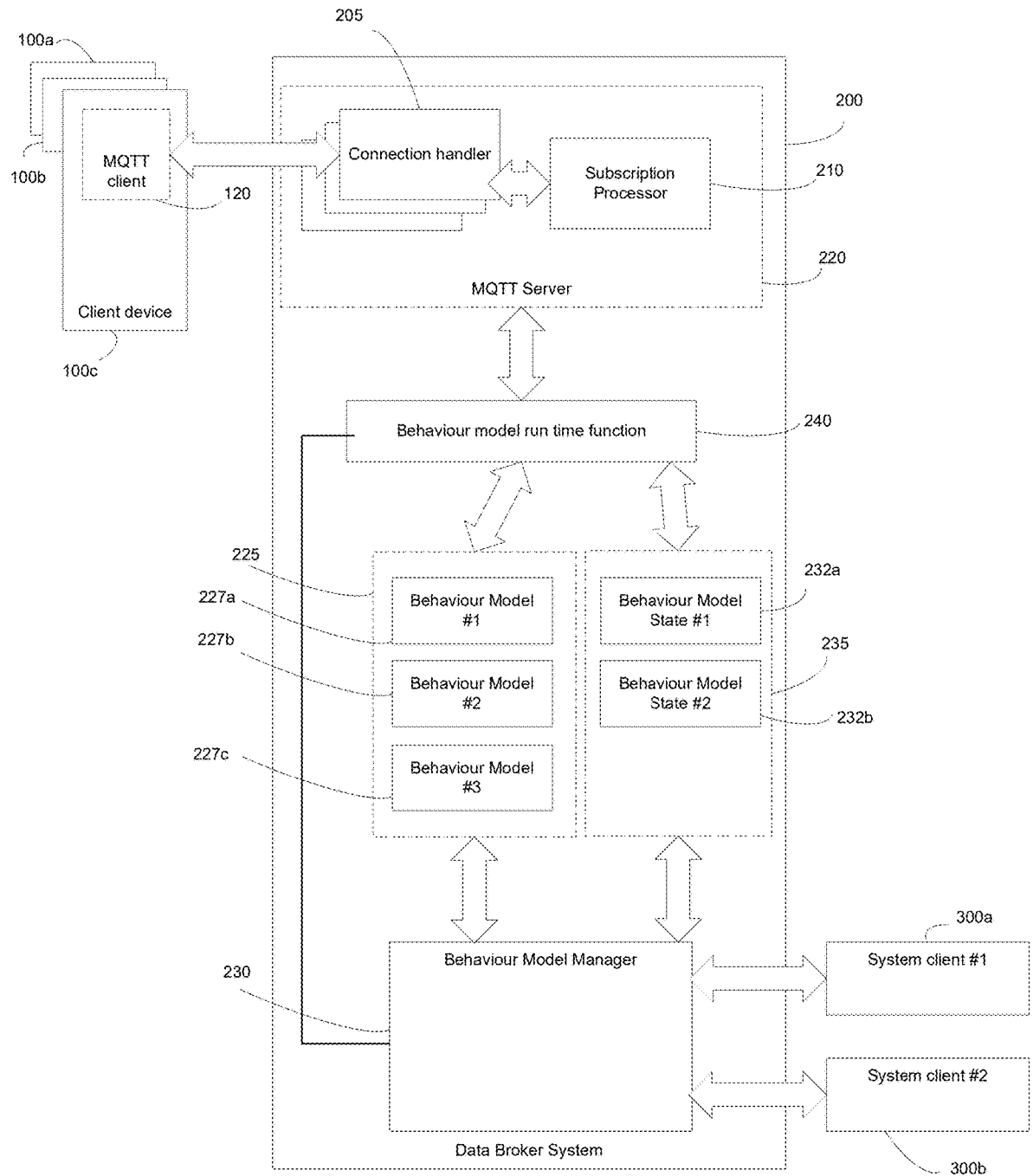
FIG. 1 is a functional schematic block diagram of a publish/subscribe messaging system in accordance with examples of the present disclosure.

FIG. 1 is a functional schematic block diagram of a publish/subscribe messaging system 400 in accordance with examples of the present disclosure.

The publish/subscribe messaging system comprises one or more client devices 100 comprising respective MQTT clients 120, a data broker system 200 comprising an MQTT server 220, and one or more system clients 300. In the example of FIG. 1, the MQTT clients 120 communicate with the data broker system 200 in accordance with an MQTT protocol. The data broker system 200 communicates with the MQTT clients 120 in accordance with the MQTT protocol when operating in a predetermined or default manner. As described further below, the deployment of a behavior model may cause the data broker system 200 to deviate from the MQTT protocol in respect of its communications with at least one MQTT client 120.\

The MQTT protocol may be MQTT or MQTT-SN or a version of one of these. In other examples, different publish/subscribe protocols may be used instead of the MQTT protocol, and in some examples, multiple protocols may be used. The MQTT clients 120 are examples of publish/subscribe messaging clients.

The publish/subscribe system provides for the transmission of control packets, which may be in accordance with a standards specification. An example of a control packet is a PUBLISH control packet, which contains a 'message' to be forwarded to subscriber clients as described below.

The PUBLISH control packet may indicate a topic associated with the message. An MQTT client 120 which generates one or more messages which are transmitted ('published') to the MQTT server 220 is referred to as a publisher client.

An MQTT client 120 may subscribe to certain messages; that is, it may transmit a subscription request to the MQTT server 220, requesting that any message which is within the scope of a subscription and which is received at the MQTT server 220 is transmitted ('published') to the client device 100. Such an MQTT client is referred to as a subscriber client. The scope of a subscription may be defined by reference to one or more topics, and/or one or more publishing clients. If a message is received, and it is within the scope of the subscription (e.g., it is received from one of the specified publishing clients and/or is associated with a specified topic) then the MQTT server 220 is to forward that message to the subscriber client.

Accordingly, MQTT server 220 comprises a subscription processing function 210 which performs subscription processing on received messages. Subscription processing comprises the steps of determining, for each received message, which, if any, subscriber clients have a subscription which includes the received message within the scope of the respective subscription.

An MQTT client 120 may be both a publisher client and a subscriber client. The MQTT server 220 comprises one or more connection handlers 205. Each connection handler 205 maintains an MQTT connection with a respective MQTT client 120. A connection handler 205 maintains any state associated with the MQTT connection. For example, a connection may be in a state where the MQTT server 220 is not permitted to transmit messages to the client. The connection handler 205 performs signaling (e.g. keep-alive signaling) related to the establishment, maintenance, and termination of a connection with the MQTT client 120. If the MQTT client 120 is a publisher client, the associated connection handler 205 receives one or more control packets, each comprising a message. The connection handler 205 requests subscription processing for the message by the subscription processor 210. If the MQTT client 120 is a subscriber client, the connection handler 205 notifies the subscription processor 210 of any requested change in a subscription of the MQTT client 120.

For each received message, the subscription processor 210 determines which (if any) MQTT client 120 has a subscription which has, within its scope, the message. For each MQTT client 120 that has a subscription which includes the message, a copy of the message is passed to the respective connection handler 205 for transmission to the subscriber MQTT client 120.

Where a quality of service (QOS) requirement applies to a message to be transmitted to a MQTT client 120, the connection handler 205 maintains state necessary to ensure that the QoS requirement is satisfied. For example, where there is a QoS requirement that the receiving subscriber client must receive the message at least once, the connection handler 205 maintains a state which indicates whether an acknowledgement from the subscriber client has been received.

Where it is not possible to transmit the message to a subscriber client immediately, the message may be buffered. A suitable buffer (not shown in FIG. 1) may be managed by the connection handler 205. The MQTT server 220 may comprise other buffers for storing messages, such as for storing received messages prior to the completion of subscription processing.

A conventional data broker system may comprise connection handlers and a subscription processor substantially as described above. A conventional data broker system may apply identical processing to all received messages, for example based on the specifications of the publish/subscribe messaging protocol. However, a single data broker system may connect to many client devices that publish or receive messages for different purposes and are of a different nature.

In an example, a publisher client may generate messages comprising sensor data, the sensor data representing measurements from the sensor. Two subscriber clients wish to receive the sensor data and accordingly subscribe to the messages. However, subsequently, it is determined that it is preferable for one of the subscriber clients to receive only sensor data where the measurements exceed a particular threshold. A further subscriber wishes to receive the sensor data, but with a rolling average measurement value added to the message.

There is currently no mechanism for modifying the processing of messages, for example to reduce a quantity of messages being received at a subscriber client, which is applicable only to a subset of messages, (e.g., depending on the transmitting (publishing) or receiving (subscribing) clients in a manner that does not interrupt the processing of other messages.

There is therefore a requirement for an improved data broker system. The data broker system 200 of FIG. 1 comprises, in addition to the connection handlers 205 and subscription processor 210 of the MQTT server 220, a behavior model run time function 240 and a behavior model manager 230.

The behavior model run time function (BMRTF) 240 implements behavior models, 227a-c within the data broker system 200. As shown in FIG. 1, representations of behavior models, 227a-c (which may be in the form of human-readable code) may be stored in a first memory region 225 of a memory of the data broker system 200.

A behavior model may be associated with a scope. The scope may define, for example, one or more of identities of relevant clients (which may be either or both of subscriber clients and publisher clients) and subsets of messages (based on contents and/or topic). Further examples of the scope of a behavior model are given below. The behavior model run time function (BMRTF) 240 controls the behavior of the MQTT server 220 in respect of MQTT clients 120 and/or in respect of certain messages which are within the scope of the behavior model. The MQTT server 220 may also provide certain indications to the behavior model run time function (BMRTF) 240.

A behavior model 227 may define one or more of the following:
  processing to be applied to, or in response to, control packets received from an MQTT client;
  processing to be applied to, or in response to, control packets to be transmitted to an MQTT client; and
  one or more state machines; and
  an initial state of a state machine.

The behavior model may specify different behavior in respect of different control packets, based on one or more of their source, their destination, their type (e.g., where 'PUBLISH' and 'SUBSCRIBE' are different types), and their contents. In particular, the behavior model may specify behavior to be applied based on the message content of a PUBLISH control packet.

In the example, first to third behavior models 227a-c have been deployed and are in operation. First and second behavior models 227a, 227b define respective state machines, whose respective state is first and second behavior model states 232a, 232b stored in a second memory region 235 of the data broker system 200. No state machine is associated with behavior model 227c and accordingly there is no corresponding state.

In the example of FIG. 1, there is one instance of each of first and second behavior models 227a, 227b, and thus there is one respective state 232a, 232b. In some examples, multiple instances of a single behavior model 227 may be deployed, and accordingly there may be multiple states 232

(each corresponding to a particular instance) associated with a single behavior model. Each instance of a behavior model may be associated with a different scope.

In the example of FIG. 1, the deployment of a behavior model 227 is controlled by the behavior model manager 230, which controls the behavior model run time function 240, and initializes the corresponding behavior model state 232.

The behavior model manager 230 also communicates with one or more system clients 300. A system client 300 may comprise a user interface or gateway function allowing an operator (such as a customer employee) to request the deployment of a behavior model. A system client transmits one or more of a behavior model definition, an instruction to deploy a behavior model, and a corresponding scope for that deployment to the behavior model manager 230. In the example of FIG. 1, there are two system clients 300a, 300b. The behavior model manager 230 may provide an application programming interface (API) for allowing communication with the system clients 300. The behavior model manager 230 may provide indications to a system client 300, for example to indicate that a requested behavior model deployment has been successfully completed.

A system client may also be a client device, in the sense that it comprises one or more MQTT clients 120.

Communications between the MQTT server 220 and MQTT clients 120 are by means of respective network interfaces of the data broker system 200 and client devices 100; these are not shown in FIG. 1 for clarity. Any suitable network, or combination of networks may be used for these communications. For example, a network interface of the data broker system 200 may be an ethernet network interface providing access to the internet via a wired local area network and an internet service provider. A network interface of a client device 100 may be a wireless network interface providing access to a wireless network, which may be a cellular network, a wireless local area network, or a low power wide area network, which in turn provides access to the internet. A client device 100 may thus establish IP connectivity (for example via a TCP/IP connection or using UDP/IP) with the data broker system 200, and accordingly request the establishment of an MQTT connection, to be operated using IP packets.

Similarly, suitable communications between the data broker system 200 and system clients 300 may be realized using appropriate IP connectivity based on one or more underlying communications networks.

Figure 2:
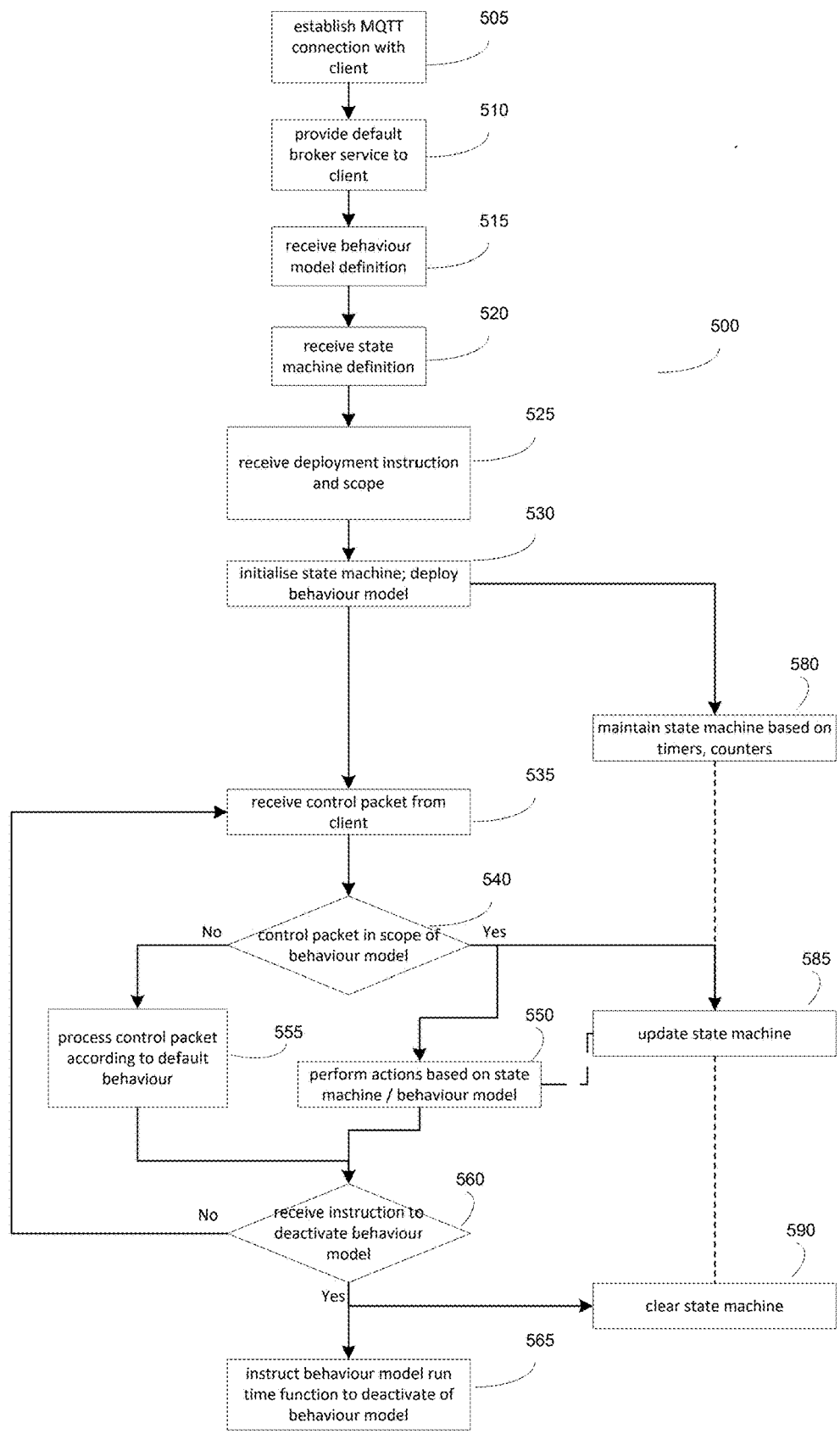
FIG. 2 is a flow chart showing a process for operating a data broker system in accordance with examples.

FIG. 2 is a flow chart showing a process 500 for operating the data broker system 200 of FIG. 1.

At step 505, an MQTT connection is established between the MQTT server 220 of the data broker system 200 and an MQTT client 120 of a client device 100. This step may be repeated for multiple MQTT clients. Step 505 may comprise receiving at the data broker system 200 a connection request ('CONNECT') control packet transmitted by the client device 100, associating a connection handler 205 with the MQTT client 120 and transmitting, by the connection handler 205 a connection request acknowledgement ('CONNACK') control packet.

At step 510 the data broker system 200 provides a 'default' broker service to the MQTT client 120. The default broker service may be one that is provided to MQTT clients when no behavior model is in operation. The default broker service may be a service that is predetermined. The default broker service may be fully in accordance with a specification, such as an MQTT specification, for the publish/subscribe messaging system.

In an example, the MQTT server 220 processes subscription requests, messages and other control packets received from the MQTT client 120, and forwards messages to the MQTT client 120 based on any subscription requests received from the MQTT client 120, in accordance with an MQTT specification.

When operating according to the default behavior, the MQTT server 220 may maintain state information associated with an MQTT client 120 which relates to the corresponding MQTT connection (for example, in respect of the operation of a keep-alive mechanism), or to a specific message (for example, in order to ensure applicable QoS requirements are satisfied). The MQTT server 220 may also maintain one or more buffers for storing messages associated with the MQTT client. The MQTT server 220 may maintain state which reflects any current subscriptions of particular clients with respect to specific topics, for the purpose of operating the subscription processor 210.

In examples, according to the default behavior, the behavior of the MQTT server 220 does not depend on the actual payload of any message (either currently being processed or previously received). In examples, according to the default behavior, the behavior of the MQTT server 220 depends on a topic of any message to the extent that subscription processing may be dependent on the topic, and accordingly, whether a message is republished.

In examples, according to the default behavior, each published message received from the MQTT client 120 is processed in a manner which is independent of the receipt (or lack of receipt) of any other message, whether from the same MQTT client or a different one. Similarly, a message for transmission to the MQTT client 120 (for example, in accordance with a subscription of the MQTT client 120) is processed irrespective of any previously received message.

At step 515, the data broker system 200 receives and stores a behavior model definition. The behavior model definition may be received from a system client 300. The behavior model definition may define aspects of the behavior to be carried out by the data broker system 200 while the behavior model is in operation. For example, the behavior model definition may define a rule according to which, if a message is received from an MQTT client which indicates that a value of a parameter (such as a sensor reading) is lower than a certain specified threshold, then that message is to be discarded, irrespective of whether any subscription exists, according to which another MQTT client would receive that message.

At step 520, the data broker system 200 receives and stores a state machine definition. The state machine definition may be received from the system client 300. The state machine definition may define aspects of the behavior to be carried out by the data broker system 200 while the behavior model is in operation. For example, the state machine definition may define a timer state, which is started on the deployment of the behavior model. The timer state is continuously decremented and when the timer expires (e.g. the value of the timer state reaches zero) a message is published to a MQTT client. An identity of the MQTT client may be defined by an associated behavior model definition or may be specified in the state machine definition.

The behavior model definition may be formatted in any suitable manner. In some examples, the behavior model definition comprises human-readable script representing the behavior model and/or an associated state machine. In an example, as described below, the behavior model definition and state machine are represented by JavaScript, which may be compliant with a DSL associated with the data broker system 200.

At step 525, the data broker system 200 receives a deployment instruction to deploy a behavior model. The deployment instruction is transmitted by the service client 300. The deployment instruction may have been generated at the service client 300. The deployment instruction may identify the behavior model definition, which may be the behavior model definition received at step 515. The deployment instruction may identify a state machine definition, which may be the state machine definition received at step 520. The deployment instruction may comprise an indication of a scope of the behavior model.

In the example process of FIG. 2, the deployment instruction comprises a state machine definition. Accordingly, at step 530, the behavior model manager 230 of the data broker system 200 initializes the state machine in accordance with the state machine definition, and indicates to the behavior model run time function 240 that the specified behavior model is to be deployed in conjunction with the state machine, and in respect of the scope specified by the deployment instruction.

The deployment of a behavior model at step 530 may comprise instructing, by the behavior model manager 230, the behavior model run time function 240 i) to control the MQTT server 220 in accordance with the deployed behavior model 227 and state 232 (if any) associated with the behavior model, and ii) to update the associated state 232 (if any) in accordance with the behavior model. The behavior model manager 230 may inform the behavior model run time function 240 of the scope of the behavior model 227 and accordingly, the behavior model run time function 240 selectively controls the MQTT server 220 to operate only on, or in response to, messages or other control packets in accordance with the scope of the behavior model 227.

The behavior model may be defined using a language which the behavior model run time function 240 interprets during the operation of the data broker system 200. The language may be a scripting language. For example, the behavior model definition may be specified using JavaScript. The behavior model run time function 240 may accordingly comprise an interpreter which operates based on the scripting language representation of the behavior model and/or state machine. Embodiments of the present disclosure can accordingly avoid the need to compile the definition of the behavior model prior to its deployment.

The following is an example extract of behavior model definition in JavaScript, in accordance with examples of the present disclosure.

```
function transform(publish, context) {
  publish.timestamp = new Date( ).toJSON( );
  return publish;
}
```

In this example, the operation of the MQTT server 220 depends on the payload of a received message, in that the payload of the published message is based on the payload of the received message, modified according to the definition.

This script is interpreted and executed in real time by the behavior model run time function 240, to modify the behavior of the MQTT server 220 to add a timestamp to a message (e.g., to an MQTT payload). The behavior model run time function 240 may execute the script by performing just-in-time compilation.

The behavior model may be defined using a domain-specific language (DSL) which can be interpreted by the behavior model run time function 240. The DSL may be based on JavaScript.

The following is an exemplary extract of a behavior model definition which provides a definition of a state machine:

```
function getTransitions(builder): FsmTransitionsConfiguration {
    return {
        initialState: 'INITIAL'
        initialStateContext: {
            lastTimestamp: 0,
        },
        transitions: [
            {
                on: 'inboundConnect',
                from: 'INITIAL',
                to: 'CONNECTED',
                condition: (publishEvent, stateContext) => {
                    return true;
                },
                actions: [
                    ( ) => { }
                ],
            }
        ],
        defaultDisconnectTransition: {
            to: 'DISCONNECTED',
        },
    }
}
```

Embodiments of the present disclosure can allow faster and easier deployments of custom behavior models. Deployment of the behavior model can be performed without interrupting the ongoing operation of the MQTT server 220. Accordingly, behavior models can be iteratively improved and deployed, through a sequence of behavior model deployment and deactivation, while the underlying (e.g., default and/or fully standards-compliant) behavior of the MQTT server 220 in providing the data broker function in the publish/subscribe messaging system is not interrupted. In particular examples, the deployment and deactivation of a behavior model does not require the disconnection of an MQTT client 120 from the MQTT server 220.

The deployment of a behavior model in this manner can be used to modify the overall behavior of the publish/subscribe messaging system, without requiring any modification to the behavior of the client devices. For example, where a client device comprising a publisher MQTT client has been misconfigured, or operates in an undesirable manner, the use of a deployed behavior model with suitable scope can mitigate the effects of this on the overall system. For example, if the MQTT client generates excessive PUBLISH control packets, the effect of this can be mitigated by a behavior model which modifies the behavior of the MQTT server 220 to discard every other received PUBLISH control packet from the MQTT client and to refrain from performing subscription processing on the discarded control packets.

In examples, the system clients 300 are remote from the data broker system 200. The data broker system 200 may be managed by a publish/subscribe system operator, and each system client 300 may be managed by a respective customer of the publish/subscribe system operator. A customer may also manage one or more client devices 100, and may in particular manage one or more client devices comprising a subscriber MQTT client. A system client 300 may comprise a user interface or gateway function allowing an operator (such as a customer employee) to request the deployment of a behavior model. The system client 300 may, in response to a request from an operator, generate and transmit the deployment instruction to the data broker system 200.

Embodiments of the present disclosure can accordingly provide a user-friendly control of aspects of the operation of the data broker system. In particular, a customer of the publish/subscribe system operator may be able to modify the behavior of the data broker system to suit their requirements, without requiring The behavior model run time function 240 may be an interface between the high-level representation of the behavior model 227 and the continuing operation of other elements (such as the connection handlers 205 and the subscription processor 210) of the data broker system 200.

The behavior model manager 230 may deploy a behavior model 227 by loading a representation of the behavior model into a first memory region 225. If the behavior model is associated with a state machine, an initialized state machine 232 corresponding to the behavior model 227 into the second memory region 235. The behavior model manager 230 may then notify the behavior model run time function 240 of the deployed behavior model 227 and the relevant locations in the behavior model memory region 225 and state machine memory region 230. The behavior model manager 230 may then notify the behavior model run time function 240 of the scope of the behavior model 227.

It will be appreciated that in other examples, the deployment of a behavior model may be carried out in a different manner. In another example, the first (behavior model) memory region 225 and second (state machine memory) region 235 are controlled by the behavior model run time function 240, and the behavior model manager 230 requests the behavior model run time function 240 to initiate the use of the behavior model 227 by providing a suitable behavior model definition.

In some examples, a behavior model 227 can be deployed (that is, put into operation) while the MQTT server 220 is operating and without requiring the MQTT server 220 to be restarted. In some examples, the deployment of the behavior model 227 does not affect one or more of:
- a state or contents of a message buffer, an existing subscription of an MQTT client,
- a state of a connection with an MQTT client,
- a state associated with a message being transmitted to, or received from an MQTT client (for example, state required to ensure the compliance with any applicable QoS requirements).

In some examples, a behavior model 227 is deployed without affecting any state maintained within the MQTT server 220. In some examples, a behavior model 227 is deployed without modifying any state maintained within the MQTT server 220 which relates to an MQTT client or a message, irrespective of whether the MQTT client or the message is within the scope of the behavior model.

In some examples, a behavior model is deployed without affecting any state relating to an MQTT client or message, where the MQTT client or the message is within the scope of the behavior model.

In some examples, a behavior model is deployed which causes the operation of a currently-deployed behavior model to cease. For example, where the new behavior model is an updated version of the currently-deployed behavior model. In some such examples, state associated with the currently-deployed behavior model may be discarded or modified when the new behavior model is deployed.

Subsequently, the behavior model run time function 240 controls the MQTT server 220 in accordance with the behavior model, state machine and scope.

When a behavior model has been deployed and is in operation, the data broker system operates in accordance with that behavior model, by carrying out processing in accordance with the behavior model (and any associated state machine). Examples of such processing that may be carried out in accordance with a behavior model include:
- discarding of a message,
- generating and publishing of a new message,
- modification of a message,
- modification of a subscription or other state associated with an MQTT client (for example, by terminating a connection with the MQTT client, by re-starting a keep-alive timer, or by flushing a buffer of outbound messages),
- generating and transmission of a control packet.

The behavior model may specify that some or all control packets are to be processed in accordance with a predetermined default behavior (e.g., in compliance with a publish/subscribe messaging protocol such as MQTT or MQTT-SN).

The behavior model may define operations which are carried out when the behavior model is deployed.

Processing of messages or other control packets while the behavior model is in operation, in accordance with the behavior model, may include functions generally as set out in co-pending application number U.S. Ser. No. 18/669,387, the contents of which are hereby incorporated by reference in their entirety.

Examples of functions that may be carried out in accordance with the behavior model are functions which modify or process a received message (including discarding the message), generate new messages or a new control message, or perform another control function. In other words, such processing may include one or more of:
- processing outbound messages (i.e. after subscription processing); and
- modifying the contents of published messages before subscription processing.

Generated new control packets (including those with newly generated messages) may be generated so as to appear to have been transmitted from a particular client. Subscription processing may be carried out as if the generated message were received from that client. The behavior model may specify a source client and/or topic to be associated with the generated message.

The behavior model may specify that a connection with a client is to be modified, terminated or established. The behavior model may specify that a subscription associated with a client is to be modified, deleted or newly created.

A state machine associated with a behavior model may define a plurality of states and associated transition conditions. The state machine may define actions that are to occur on a state transition. The behavior model may define actions which are determined based on the current state of the state machine.

A state in a state machine may represent one or more of the following:
- a connection status of an MQTT client;
- a counter (e.g. a number of control packets received);
- a time value (e.g., since a particular event, or until a timer expires); and
- aspects of the message content of messages received (e.g. a most recent temperature measurement indicated by a message received from a sensor).

This list is not exhaustive, and it will be appreciated that a state in the state machine may represent any aspect of the operation of the MQTT server 220. In particular, the state of the state machine may reflect, jointly, a sequence of activities at the MQTT server 220. For example, the state of the state machine may indicate that, out of four MQTT clients within the scope of the behavior model, only three have an active MQTT connection with the MQTT server and that the cumulative number of messages published by each of those three since the behavior model was deployed is less than five.

The behavior model, possibly in conjunction with a state machine, may determine or collect statistics or update an event log.

Correspondingly, state transitions within the state machine may be responsive to any activity within the scope of the corresponding behavior model, which occurs within the MQTT server 220 (such as control packet reception or transmission), or that can occur autonomously (for example, the expiry of a timer). Examples of events which may trigger a state transition include:
- establishment of an MQTT connection;
- receipt of a message published by an MQTT client;
- receipt of a particular type of control packet from an MQTT client;
- publishing by the MQTT server of a message to an MQTT client.

The state transitions may be further conditional on one or more of an identity of the MQTT client, a topic associated with a message or the contents of a message itself.

The behavior model run time function 240, when operating a behavior model and associated state machine, may be Turing-complete.

In the example of FIG. 2, the behavior model specifies behavior based on a combination of a state machine and received control packets which are received from MQTT clients which are within the defined scope.

Accordingly, after step 530 then step 580 is carried out, in which the state machine is maintained, and any state which is independent of the receipt of a control packet is accordingly updated. An example of such state may include a timer state. Similarly, within step 580, any actions defined by the state machine and behavior model which occur independently of the receipt of a control packet occur. For example, when a timer expires, a new message may be generated for transmission to a particular MQTT client, and the timer may be restarted.

At step 535, a control packet is received from an MQTT client and, at step 540, it is determined whether that control packet is within the scope of the behavior model.

The scope of a behavior model may be defined in any suitable terms. For example, the scope may be defined by one or more of the following:
- an identity of an MQTT client, where all of its interactions with the MQTT server 220 are within the scope of the behavior model;
- a state within the MQTT server 220 associated with an MQTT client (for example an occupancy of an outbound message buffer);
- an identity of an MQTT client from which a published message is received;
- a topic associated with a received message; and
- an identity of an MQTT client to which a published message is to be sent, in accordance with a subscription of that MQTT client.

In general, the scope of a behavior model may identify an aspect of the operation of the MQTT server 220 which, according to the behavior model, can affect the subsequent behavior of the MQTT server 220. Accordingly, in some examples, the behavior model run time function 240 may send a notification indication request the MQTT server 220 to request the MQTT server 220 to notify it of certain activity (e.g., state changes), messages, or other control packets. The notification indication request may comprise a notification scope defining which activities, messages and control packets are to be notified to the behavior model run time function 240. The notification scope may be the same as the scope of the behavior model.

While the behavior model is in operation, the MQTT server 220 may notify the behavior model run time function 240 of the occurrence of an event, or a particular control packet if the event or control packet is within the notification scope. This may comprise, for example, forwarding a copy of all messages received from an MQTT client to the behavior model run time function 240, if the MQTT client is within the scope of the behavior model.

In some examples, notification scope is broader than the scope of the behavior model and accordingly, the behavior model run time function 240 receives information regarding operations within the MQTT server 220 extending beyond the scope of the behavior model. In such examples, a determination as to whether the notified event or control packet is within the scope of the behavior model is performed by the behavior model run time function 240. In general, step 540 may be carried out by the MQTT server 220 or by the behavior model run time function 240, or jointly by the MQTT server 220 and the behavior model run time function 240.

In the example of FIG. 2, the scope of the behavior model is defined by a set of MQTT clients, and all control packets received from those MQTT clients are within the scope of the behavior model.

At step 540, if the control packet is received from one of the MQTT clients within the scope of the behavior model, then control passes to step 585, where the state of the state machine is updated. Control also passes (either before, or after, or in parallel with step 585) to step 550, in which any action defined by the behavior model in response to receiving the control packet is carried out. In some examples, the determination of which, if any, action is to be carried out is based on the state of the state machine, after the update performed at step 580, as illustrated by the dashed line between step 585 and step 550.

To illustrate the behavior that might be carried out at steps 585 and 550, in an example, the state machine may include a counter representative of the number of control packets received from any MQTT client within the scope of the behavior model. The behavior model and state machine may specify that, when the counter reaches a predetermined number, the counter is to be reset and a message, defined as part of the behavior model, is to be generated and published to a particular MQTT client. Accordingly, at step 585, the counter is reset to zero, and at step 550, the message is generated and published.

By way of a further example, a behavior model may update a subscription record for a first MQTT client to add a subscription to messages sent from a second MQTT client, in response to determining that the second MQTT client has published at least four messages within a sequence of non-overlapping one-minute time windows. The behavior model may discard (irrespective of any other subscription in effect) the message published by the second MQTT client prior to this threshold being met. Accordingly, the state of the corresponding state machine may reflect a timer since the start of the time window, and a counter of the number of messages published by the second MQTT client since the timer started.

As described above, step 580 may be repeated, or continuously operate in parallel with other steps; this is illustrated by the dashed line connecting step 585 and 580.

If, at step 540, it is determined that the MQTT client from which the control packet was received is not within the scope of the behavior model, then control passes to step 555. At step 555, the control packet is processed by the MQTT server 220 in accordance with the default behavior described above. In particular, the processing of the control packet does not depend on the behavior model or on the state of the associated state machine.

In some examples, the behavior model may specify behavior which is in addition to the default behavior. In such a case, then at step 550 the default behavior may also be carried out.

In some examples, the behavior model run time function 240 is not configured to control the MQTT server 220 to override or prevent the default behavior, and therefore the default behavior is carried out by the MQTT server 220 irrespective of the behavior model definition. In such examples, a behavior model may define only behavior which occurs in addition to the default behavior.

The process continues with step 560. At step 560, the behavior model manager 230 determines whether it has received an instruction to deactivate the behavior model. The instruction may be received from the system client 300.

If at step 560 it is determined that such an instruction has not been received, then control returns to step 535, and subsequent control packets are processed selectively in accordance with the default behavior or in accordance with the behavior model, or both.

If at step 560 it is determined that such an instruction has been received, then control passes to step 590, in which the state machine is cleared, and step 565 in which the behavior model run time function 240 is instructed to deactivate the behavior model.

The deactivation of the behavior model may comprise sending, by the behavior model run time function 240, a modified notification indication or a cancel notification indication to the MQTT server 220. The cancel notification indication may be used to indicate that there is no notification scope, for example because no behavior model is in operation. The modified notification indication may be used if one or more behavior models remain in operation.

In response to receiving the modified notification indication or the cancel notification indication, the MQTT server 220 amends the set of activities, messages or other control packets that are indicated to the behavior model run time function 240 or ceases sending any indications of such activities, messages or other control packets to the behavior model run time function 240.

The process may then continue with, for example, step 510, step 515, step 525 or step 535.

In some examples, the behavior model is not associated with a state machine and, accordingly, step 520, step 580, step 585 and step 590 may be omitted and at step 550 there is no dependency on a state of a state machine.

In some examples, steps are performed in a different order. One or more steps may be omitted. In some examples steps are performed in parallel. For example, step 510 may continue to be performed at the same time as any one of step 515, step 520 and step 525.

In some examples, a behavior model definition may be pre-configured in the data broker system 200. In some examples, a state machine definition may be pre-configured in the data broker system 200. Accordingly, one or both of step 515 and step 520 may be omitted, and the instruction at step 525 may identify the pre-configured behavior model and/or the pre-configured state machine.

In the example of FIG. 2, the scope of the behavior model is limited to a specified set of MQTT clients. However, in some examples, the scope may be unlimited or absent, and the behavior model is applied universally, in respect of all operations of the MQTT server 220.

In some examples, multiple behavior models are in operation simultaneously. These behavior models may have disjoint (i.e., non-overlapping), identical, or overlapping (but not identical) scope. For example, a first behavior model may have a scope encompassing all MQTT clients associated with sensors of a particular type (e.g., temperature sensors). A second behavior model may have a scope encompassing all MQTT clients in a particular building. Messages published by temperature sensors in that building may be processed in accordance with both behavior models.

In the example of FIG. 1, the behavior model run time function 240 is shown as being separate from, but interacting with, the MQTT server 220. This arrangement is shown for illustrative purposes only and the present disclosure is not limited to such an arrangement. In an alternative arrangement, for example, the deployment of a behavior model comprises the modification of one or more aspects of the operation of the MQTT server 220. For example, a behavior model which acts on messages being published from the data broker system 200 to clients 100 may be deployed by modifying or initiating a run time function which is part of, or associated with, the relevant connection handlers 205.

In the example of FIG. 2, the behavior model definition, state machine definition and scope are described as separate elements. In some examples, one or more of these may be combined. For example, a behavior model definition may include the associated state machine definition.

The behavior model definition, state machine definition and deployment instructions may be sent from the same system client to the data broker system, or may be sent from different system clients. The behavior model definition and state machine definition may be obtained from a further entity (e.g., a behavior model server). The behavior model definition and state machine definition may be requested by the data broker system from a behavior model server. This request may be in response to receiving (such as at step 525 in the example of FIG. 2) the deployment instruction from the system client.

In some examples, a system client may be associated with a permission scope, which may define a set of clients. The system client may have permission to request the deployment of only behavior models which have a scope within that permission scope. For example, the data broker system 200 may connect to clients owned or operated by a particular organization, and a system client may be permitted to request deployment only for behavior models whose scope does not extend beyond those clients.

In some examples, in response to receiving the deployment instruction from a system client at step 525, the data broker system 200 may determine whether the scope of the behavior model is within the permission scope of the system client. If it is, then the process continues with step 530 as described above. If the scope of the behavior model extends beyond (or is entirely outside of) the permission scope of the system client, the deployment instruction may be rejected. A rejection indication may be sent to the system client and step 530 is not carried out.

For example, where a system client 300 is operated by a customer of a publish/subscribe system operator, and controls or owns a set of one or more client devices 100 which each comprise a subscriber MQTT client, the permission scope associated with that system client 200 may define the associated set of one or more subscriber MQTT clients, and the data broker system 200 may permit the deployment of behavior models, in response to a request from the system client, only if the behavior model does not affect messages sent to any MQTT clients other than the set of one or more subscriber MQTT clients defined by the permission scope.

In some embodiments, the system further comprises an administrator client, which is remote from, but connected to, the data broker system. The administrator client may provide (e.g., via a user interface or gateway function) access to a management function (not shown in FIG. 1) within the data broker system which permits modification of the program code defining the operation of one or more of the MQTT server 220, the behavior model run time function (BMRTF) 240 and the behavior model manager 230. The management function may also allow the remote modification of a permission scope associated with a system client 300.

By providing different capabilities to system clients and administrator clients, suitable levels of control over the operation of the data broker system 200 can be allocated to operators of the respective system clients and administrator clients.

Figure 3:
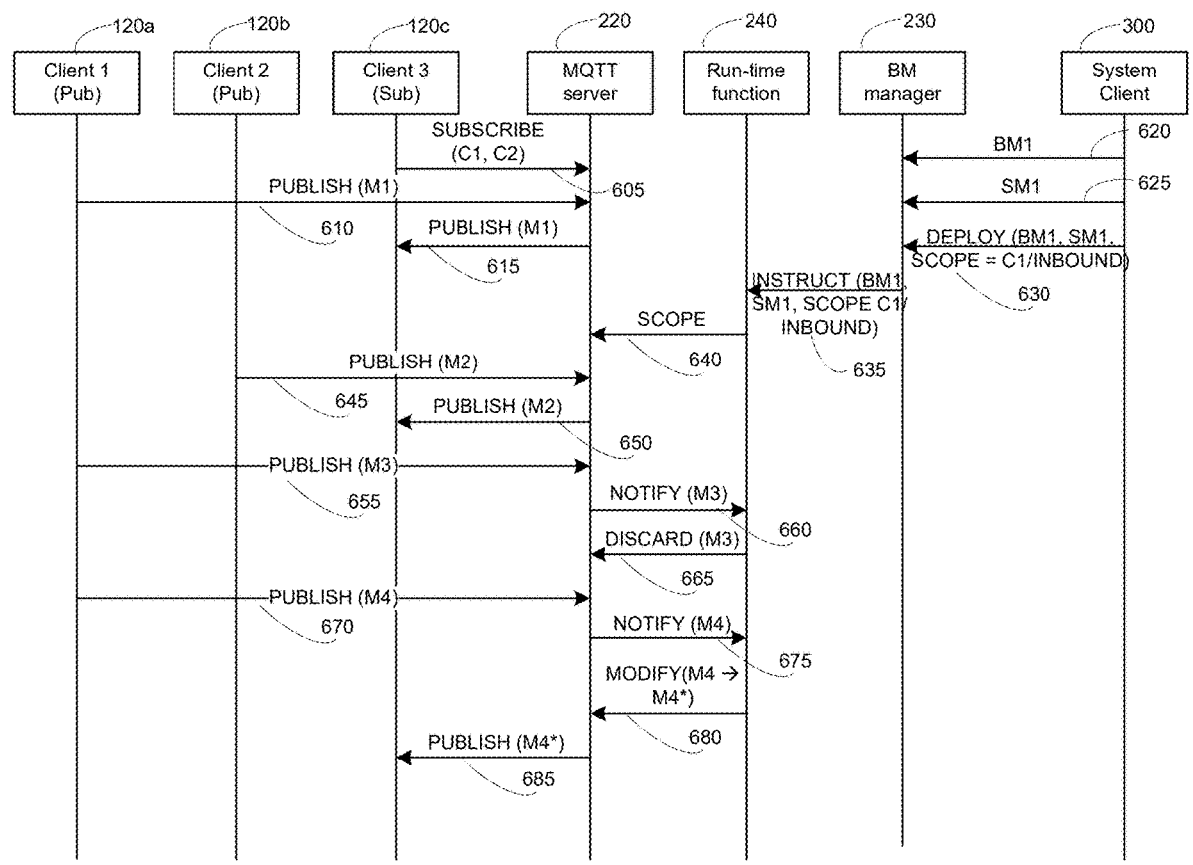
FIG. 3 is a message sequence chart showing an example of messages and other indications sent within the publish/subscribe messaging system of FIG. 1 in accordance with examples.

FIG. 3 is a message sequence chart showing an example of messages and other indications sent within the publish/subscribe messaging system 400 of FIG. 1 in accordance with examples of the present disclosure.

Initially (not shown), first and second publisher MQTT clients 120a and 120b ('C1' and 'C2' respectively) and subscriber MQTT client 120c have established respective connections with the MQTT server 220 of the data broker system 200, in accordance with the MQTT or MQTT-SN standards.

Subscriber client 120c transmits a SUBSCRIBE control packet 605 to the MQTT client 220 to request a subscription to messages published by the first and second publisher MQTT clients 120a, 120b. In response to receiving the SUBSCRIBE control packet 605, the MQTT client 220 modifies its subscription data to record that messages published by the first and second publisher MQTT clients 120a are to be forwarded to the subscriber MQTT client 120c.

Subsequently, 120a transmits a first PUBLISH control packet 610 comprising a message 'M1' to the MQTT server 220. In response to receiving the first PUBLISH control packet 610, and based on its subscription data, the MQTT server 220 forwards the message 'M1' in a second PUBLISH control packet 615. Separately, the system client 300 transmits a behavior model definition 'BM1' to the behavior model manager 230.

The system client 300 then transmits a state machine definition 'SM1' to the behavior model manager 230.

The system client 300 then transmits a deployment instruction 630, requesting the MQTT server 220 to implement a behavior model as defined by the 'BM1' behavior model definition together with a state machine as defined by the 'SM1' state machine definition. The deployment instruction 630 also comprises an indication of the scope of the behavior model, specifically, to apply to inbound (i.e., received) messages received at the data broker system 200 from the first publisher MQTT client 120a ('C1').

The system client 300 may perform the transmissions shown in FIG. 3 in response to a user input at the system client 300. As described above, one or both of the behavior model definition 'BM1' and the state machine definition 'SM1' may be in the form of a script which can be interpreted by the behavior model run time function 240 of the data broker system 200. For example, the behavior model definition 'BM1' and the state machine definition 'SM1' may be in the form of JavaScript code compliant with a DSL. One or more of the behavior model definition BM1, the state machine definition SM1 and the deployment instruction 630 may be generated by the service client 300. The generation may be in response to a user input at a user interface of the service client 300, or may be in response to a request received at the service client 300, for example from another device.

In the example of FIG. 3, according to the behavior model definition BM1 and state machine SM1, any received message of type 'M3' which is in scope is to be discarded and no subscription processing is to be carried out. If such a message has previously been received since the deployment of the behavior model, then any subsequent message of type 'M4' is to be modified to a type 'M4*' before normal subscription processing (e.g., in accordance with the MQTT protocol) is performed.

In response to receiving the deployment instruction 630, the behavior model manager 230 sends an instruction 635 to the behavior model run time function 240, corresponding to the deployment instruction 630. That is, the behavior model manager 230 instructs the behavior model run time function 240 to implement a 'BM1' behavior model together with a 'SM1' state machine, in respect of messages received from the first publisher MQTT client 120a.

In response to receiving the instruction 635, the behavior model run time function 240 deploys the behavior model by initializing a state machine in accordance with the SM1 state machine definition (not shown in FIG. 3), sending a notification scope indication 640 to the MQTT server 220, and monitors for notifications from the MQTT server 220.

The notification scope indication 640 to the MQTT server 220 requests notifications to be generated by the MQTT server 220 and sent to the behavior model run time function 240. The notification scope is determined by the behavior model run time function 240 based on the scope indicated in the instruction 635. In the example of FIG. 3, the notification scope is the same as the scope of the behavior model, and accordingly the notification scope indication 640 indicates that the behavior model run time function 240 is to be notified of any received messages which have been received from the first publisher MQTT client 120a. The behavior model run time function 240 then monitors for notifications from the MQTT server 220.

Subsequently, a third PUBLISH control packet 645, comprising message 'M2', is received from the second publisher MQTT client 120b. Based on the notification scope received in the notification scope indication 640, the MQTT server 220 determines that the third PUBLISH control packet 645 is not within the notification scope. Because this message is not within the notification scope indicated by the notification scope indication 640, it is processed in accordance with the default, or pre-determined behavior, which may be fully in compliance with the MQTT standard, and the message 'M2' is forwarded in a fourth PUBLISH control packet 650 to the subscriber MQTT client 120c.

A fifth PUBLISH control packet 655, comprising message 'M3', is then received from the first publisher MQTT client 120a. Based on the notification scope received in the notification scope indication 640, the MQTT server 220 determines that the fifth PUBLISH control packet 655 is within the notification scope. Because this message is within the notification scope, the MQTT server 220 generates a first notification 660, indicating the message 'M3', to the behavior model run time function 240. In the example of FIG. 3, the first notification 660 does not indicate the identity of the publisher of the message 'M3'. In some examples, further information (for example, the entire control packet, which may include an identification of the first publisher MQTT client 120*a*) may be included in the notification.

In response to receiving the first notification 660, the behavior model run time function 240 updates the associated state machine to indicate that at least one 'M3' message has been received. In accordance with the behavior model, the behavior model run time function 240 generates and sends a first instruction 665 to the MQTT server 220 to discard, without subscription processing, the message 'M3'.

In response to the first instruction 665, the behavior model run time function 240 discards the message M3 and it is not published to the subscriber MQTT client 120*c*, even though the subscriber MQTT client 120*c* has previously requested to receive all messages published by the first publisher MQTT client 120*a*.

A sixth PUBLISH control packet 670, comprising message 'M4', is then received from the first publisher MQTT client 120*a*. Based on the notification scope received in the notification scope indication 640, the MQTT server 220 determines that the sixth PUBLISH control packet 670 is within the notification scope. Because this message is within the notification scope, the MQTT server 220 generates a second notification 675, indicating the message 'M4', to the behavior model run time function 240.

In response to receiving the second notification 675, the behavior model run time function 240 determines that a message of type 'M4' is to be modified to a type 'M4*' before normal subscription processing (e.g., in accordance with the MQTT protocol) is performed, if a message of type 'M3' has previously been received since the deployment of the behavior model. Based on the current state of the state machine, the behavior model run time function 240 determines that at least one such 'M3' message has been received. Accordingly, and in accordance with the behavior model, the behavior model run time function 240 generates and sends a second instruction 680 to the MQTT server 220 to modify, before subscription processing, the message 'M4' to 'M4*'.

In response to the second instruction 680, the behavior model run time function 240 first modifies the message 'M4' to 'M4*' and then publishes the modified message in a seventh PUBLISH control packet 685 to the subscriber MQTT client 120*c*, in accordance with the SUBSCRIBE control packet 605.

It will be appreciated that additional messages, such as acknowledgement messages or indications, may be transmitted during the sequence shown in FIG. 3.

Figure 4:
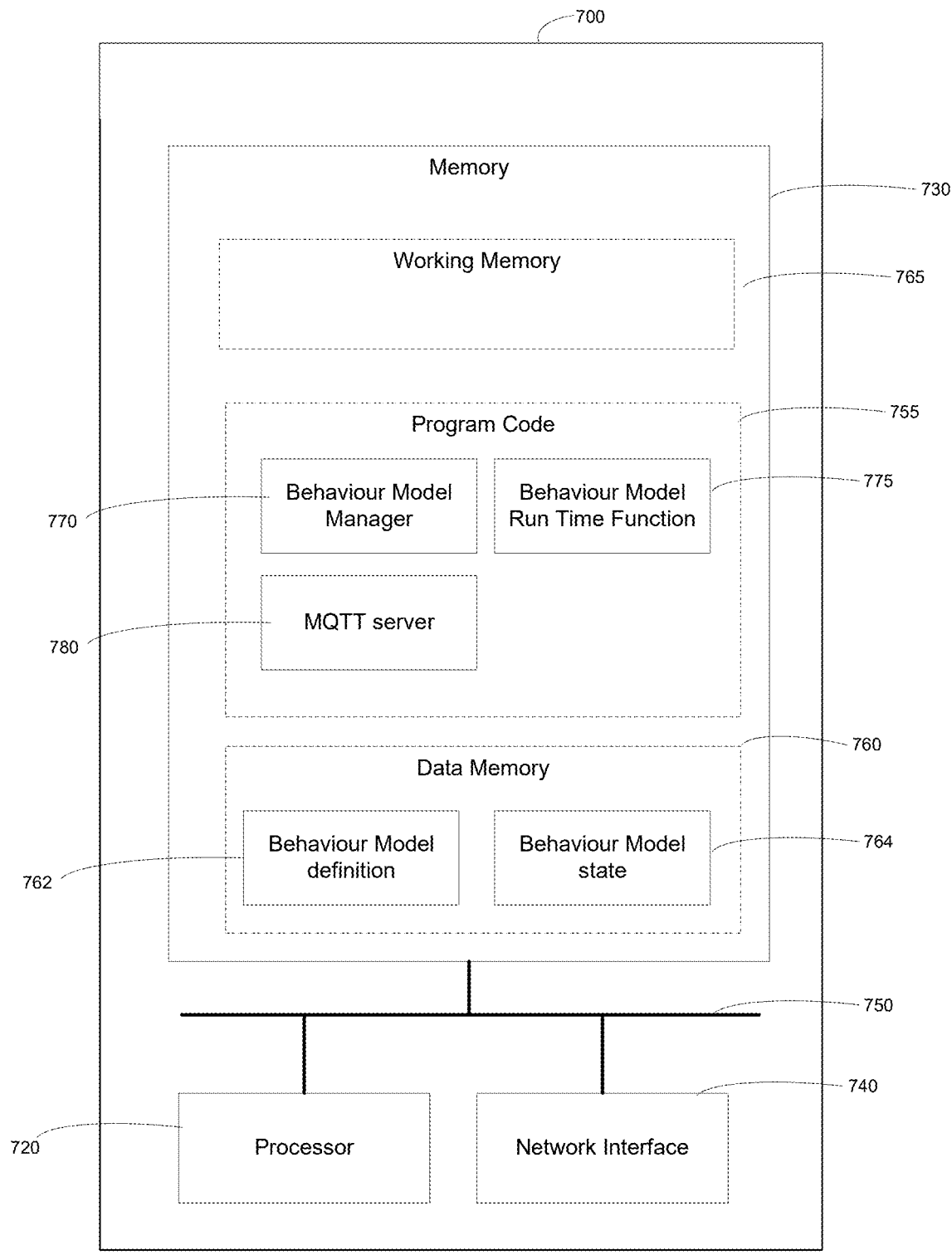
FIG. 4 is a simplified block diagram of a data broker system in accordance with examples.

FIG. 4 is a simplified block diagram of the data broker system 700 corresponding to the data broker system 200 described above, in accordance with examples. As shown, the data broker system 700 includes a processor 720, memory 730, and a network interface 740 which are coupled by a bus interface 750. The network interface 740 is for bidirectional communication. The memory 730 comprises a storage medium on which is stored program code 755, a data memory 760 and a working memory 765.

The program code 755 may comprise behavior model manager computer program code 770, behavior model run time function computer program code 775 and MQTT server computer program code 780 which, when executed by the processor 720, cause the data broker system 700 to implement, respectively, the behavior model manager 230, the behavior model run time function 240 and the MQTT server 220 described above. In general, the program code 755 when executed by the processor 720, causes the data broker system 700 to implement one or more of the processes of the data broker system 200 described above, and in particular may implement the process 500 shown in FIG. 5.

The data memory 760 comprises a behavior model definition region 762, which may correspond to the first memory region 225 described above, within which is stored representations of one or more behavior models, and a behavior model state region 764 which may correspond to the second memory region 235 within which is stored behavior model states, as described above.

The working memory 765 may be used for the temporary storage of other variables and state, such as buffers of messages, and state associated with MQTT connections.

In some examples, the data broker system 700 may comprise more than one processor. In some examples, the data broker system 700 may comprise more than one network interface.

Figure 5:
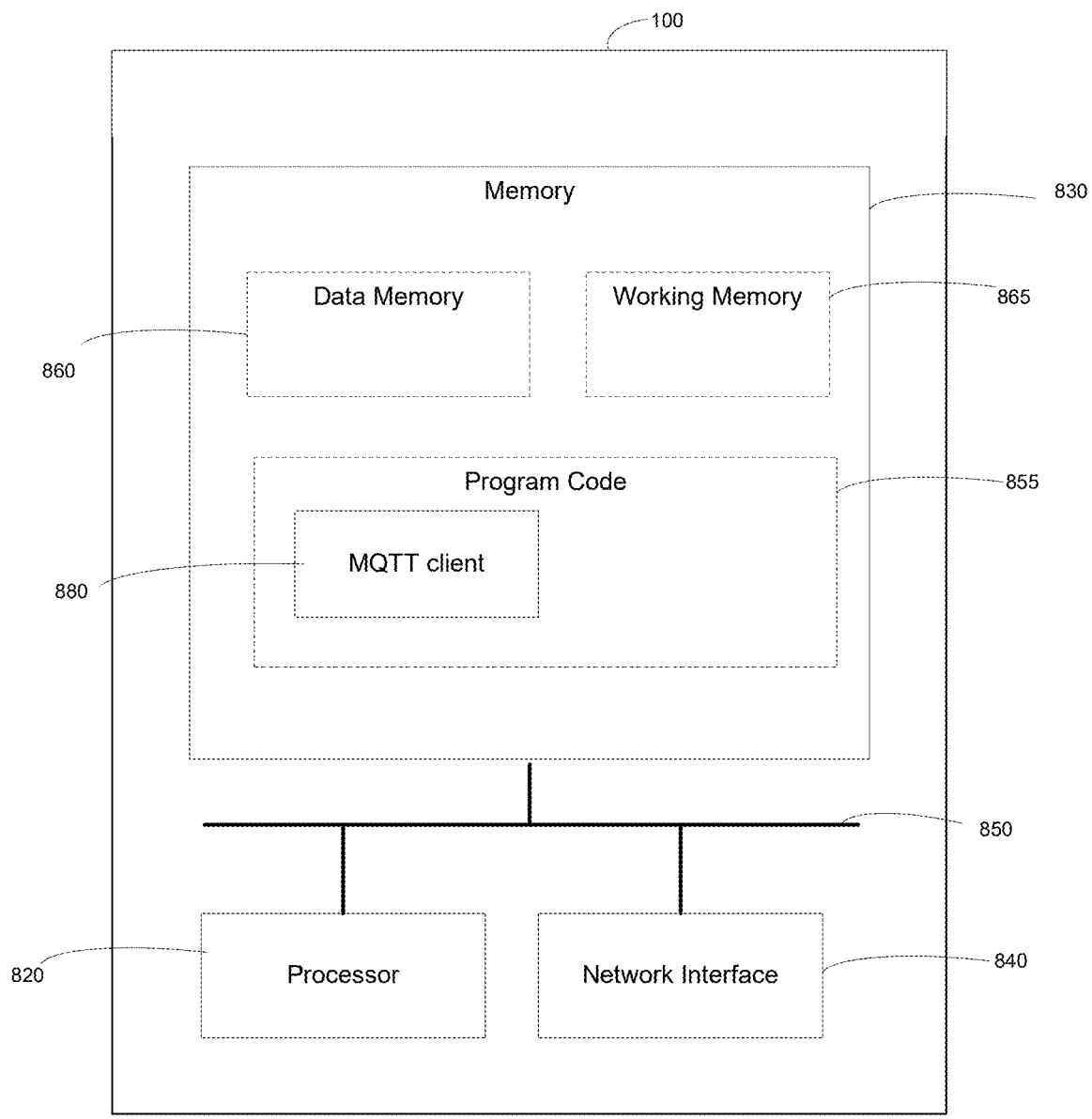
FIG. 5 is a simplified block diagram of a client device in accordance with examples.

FIG. 5 is a simplified block diagram of the client device 100 in accordance with examples. As shown, the client device 100 includes a processor 820, memory 830, and a network interface 840 which are coupled by a bus interface 850. The network interface 840 is for bidirectional communication. The memory 830 comprises a storage medium on which is stored program code 855, a data memory 860 and a working memory 865.

The program code 855 comprises MQTT client computer program code 880 which, when executed by the processor 820, causes the client device 100 to implement the MQTT client 120 described above. In general, the program code 855 when executed by the processor 820, causes the client device 100 to perform the processes described above.

The working memory 865 may be used for the temporary storage of variables and state, such as buffers of messages, and state associated with MQTT connections.

In some examples, the client device 100 may comprise more than one processor. In some examples, the client device 100 may comprise more than one network interface. In some examples, the client device 100 may comprise one or more interfaces for connecting to one or more respective sensor devices.

Figure 6:
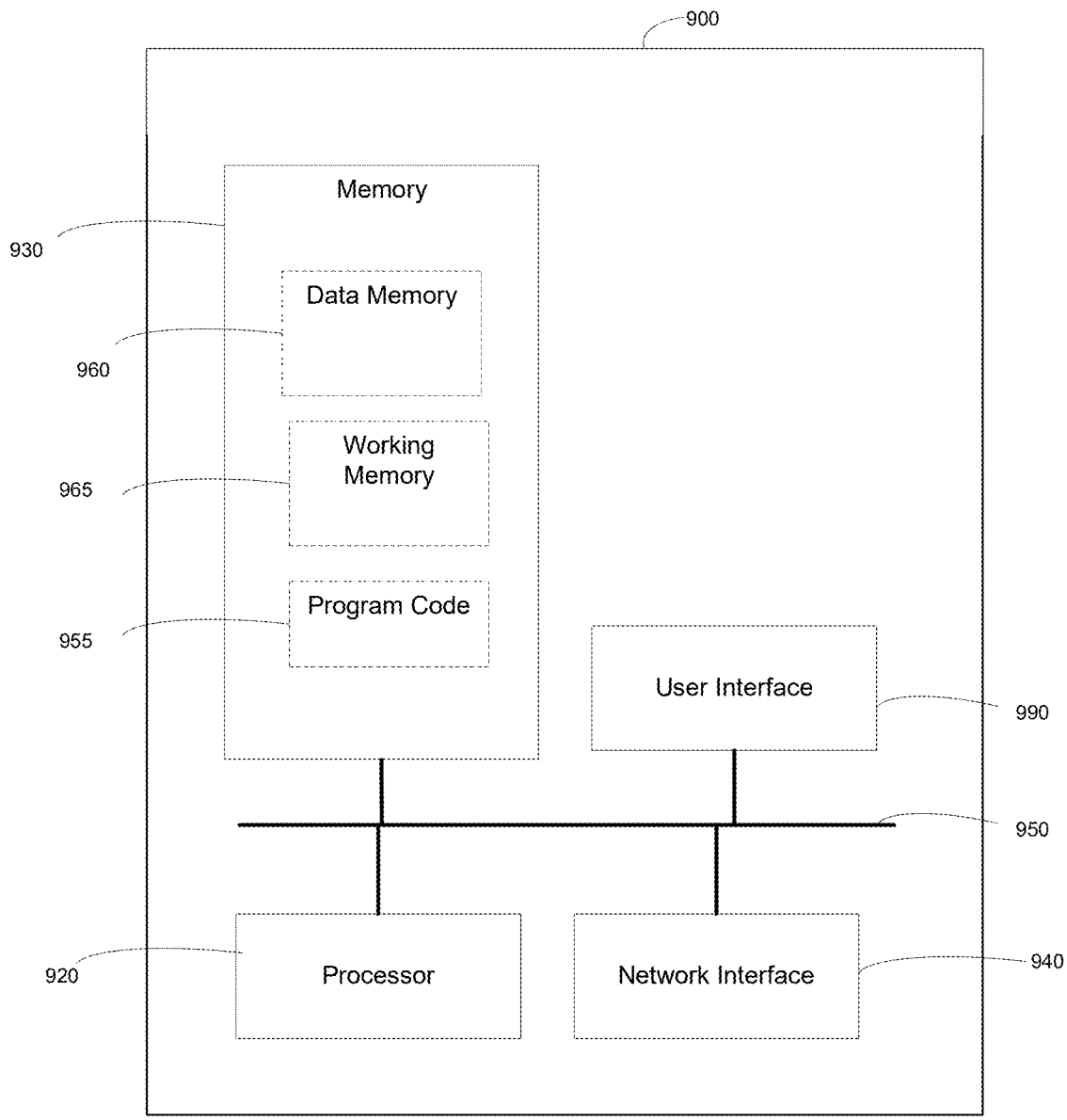
FIG. 6 is a simplified block diagram of a service client in accordance with examples.

FIG. 6 is a simplified block diagram of a service client 900 corresponding to the service clients 300 described above, in accordance with examples. As shown, the service client 900 includes a processor 920, memory 930, network interface 940, and user interface 990 which are coupled by a bus interface 850. The network interface 940 is for bidirectional communication. The memory 930 comprises a storage medium on which is stored program code 955, a data memory 960 and a working memory 965.

The program code 955 when executed by the processor 920, causes the service client device 900 to implement the processes of the service client 300 as described above. The working memory 965 may be used for the temporary storage of variables and state.

In some examples, the service client 900 may comprise more than one processor. In some examples, the service client 300 may comprise more than one network interface.

In some examples, one or more of the client device 100, data broker system 200 and service client 300 may be implemented using a plurality of respective devices, in a distributed architecture. In this case, the portions of memory 730, 830, 930 shown in FIG. 4, FIG. 5 and FIG. 6 may be distributed, so that some device instances do not include all of the memory regions shown in the respective figure.

The processors 720, 820, 920 may be of any type suitable and may include general purpose computers, and application-specific integrated circuits as non-limiting examples. The storage media on which program code 755, 855, 955 is stored may be non-transitory storage media.

The above examples are to be understood as illustrative examples. Further examples are envisaged. For example, systems as discussed herein may be deployed in other configurations and scenarios in which generated messages may be generated and transmitted by clients in a manner which is unexpected or undesirable. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

Examples of the present disclosure may be in accordance with the following numbered paragraphs:

Paragraph 1. A method comprising: establishing by a data broker system in a publish/subscribe messaging system, in accordance with a publish/subscribe messaging protocol, a respective connection with each of one or more publish/subscribe messaging clients, after the establishing, receiving at the data broker system from a system client a deployment instruction instructing the data broker system to deploy a behavior model for modifying an operation of the data broker system, and in response to receiving the deployment instruction, processing control packets received at the data broker from the one or more publish/subscribe messaging clients in accordance with the behavior model.

Paragraph 2. A method according to paragraph 1, the method comprising interpreting, at a run time, a script representation of the behavior model.

Paragraph 3. A method according to paragraph 2, the method comprising receiving from the system client the script representation of the behavior model.

Paragraph 4. A method according to any of paragraphs 1 to 3, the method comprising processing control packets received at the data broker before receiving the deployment instruction in a first mode of operation in accordance with a predetermined default behavior.

Paragraph 5. A method according to paragraph 4, wherein the predetermined default behavior is compliant with a publish/subscribe messaging protocol.

Paragraph 6. A method according to paragraph 5, wherein the publish/subscribe messaging protocol is an MQTT protocol or an MQTT-SN protocol.

Paragraph 7. A method according to any of paragraphs 4 to 6, the method comprising switching, in response to receiving the deployment instruction, to a second mode of operation in which the control packets received at the data broker are processed in accordance with the behavior model, wherein the switching from the first mode of operation to the second mode of operation is performed without modifying one or more of: a state or contents of a message buffer at the data broker system; an existing subscription of a publish/subscribe messaging client; a state of a connection with a publish/subscribe messaging client; and a state associated with a message being transmitted to, or received from a publish/subscribe messaging client.

Paragraph 8. A method comprising: generating at a system client a deployment instruction for instructing a data broker system in a publish/subscribe messaging system to deploy a behavior model for modifying an operation of the data broker system, the behavior model defining a manner of processing control packets received from one or more publish/subscribe messaging clients at the data broker system, and transmitting, by the system client to the data broker system the deployment instruction.

Paragraph 9. A method according to any of paragraphs 1 to 8, wherein the behavior model is associated with a state machine.

Paragraph 10. A method according to paragraph 9, wherein the state of the state machine is updated, while the behavior model is in operation, in response to one or more of: a receipt of a control packet at the data broker system; an establishment of a connection with a publish/subscribe messaging client; publishing, by the data broker system, a message.

Paragraph 11. A method according to paragraph 9 or paragraph 10, wherein the state of the state machine represents one or more of: a connection status of a publish/subscribe messaging client; a counter value; a time value; and message content of one or more messages received.

Paragraph 12. A method according to any of paragraphs 9 to 11, wherein when the behavior model is in operation, a published message received at the data broker system is processed in accordance with the behavior model, based on the state of the associated state machine.

Paragraph 13. A method according to any of paragraphs 1 to 12, wherein the behavior model is associated with a scope defining characteristics of control packets which are to be processed in accordance with the behavior model.

Paragraph 14. A method according to paragraph 13, wherein the scope defines one or more of: a set of one or more publish/subscribe messaging clients; and a topic.

Paragraph 15. A method according to paragraph 13 or paragraph 14, wherein the scope is transmitted from the service client to the data broker system.

Paragraph 16. A method according to any of paragraphs 13 to 15, the method comprising: after receiving the deployment instruction, receiving a control packet from a publish/subscribe messaging client, determining whether the control packet is within the scope of the behavior model, and in response to determining that the control packet is within the scope of the behavior model, processing the control packet in accordance with the behavior model.

Paragraph 17. A method according to any of paragraphs 1 to 16, wherein the behavior model defines one or more of: processing to be applied to, or in response to, a control packet received from a publish/subscribe messaging client; and processing to be applied to control packets to be transmitted to a publish/subscribe messaging client.

Paragraph 18. A method according to any of paragraphs 1 to 17, wherein processing a control packet received at the data broker received from the one or more publish/subscribe messaging clients in accordance with the behavior model comprises one or more of: discarding of a message received within the control packet; generating and publishing a new message; modification of the message received within the control packet; modification of a subscription or other state associated with a publish/subscribe messaging client; generating and transmission of a control packet to a publish/subscribe messaging client; processing the control packet in accordance with the predetermined default behavior.

Paragraph 19. A data broker system, comprising a network interface, one or more memories, and one or more processors, the one or more memories having stored thereon instructions, which when executed by the one or more processors, cause the data broker system to receive from a system client a deployment instruction instructing the data broker system to deploy a behavior model for modifying an operation of the data broker system, and in response to receiving the deployment instruction, to process control packets received at the data broker system received from one or more publish/subscribe messaging clients in accordance with the behavior model.

Paragraph 20. A publish/subscribe messaging system, comprising a data broker system according to paragraph 19; a client device, comprising a network interface, one or more memories, and one or more processors, the one or more memories having stored thereon instructions, which when executed by the one or more processors, cause the client device to implement a publish/subscribe messaging client; and an apparatus, comprising a network interface, one or more memories, and one or more processors, the one or more memories having stored thereon instructions, which when executed by the one or more processors, cause the apparatus to transmit to the data broker system a deployment instruction to instruct the data broker system to deploy a behavior model for modifying an operation of the data broker system, the behavior model defining a manner of processing control packets received from the publish/subscribe messaging client at the data broker system.

What is claimed is:

1. A method comprising:
establishing by a data broker system in a publish/subscribe messaging system, in accordance with a publish/subscribe messaging protocol, a respective connection with each of one or more publish/subscribe messaging clients,
   after the establishing, receiving at the data broker system from a system client a deployment instruction instructing the data broker system to deploy a behavior model for modifying an operation of the data broker system,
   interpreting, at a run time, a script representation of the behavior model, and
   in response to receiving the deployment instruction, processing control packets received at the data broker from the one or more publish/subscribe messaging clients in accordance with the behavior model.

2. A method according to claim 1, the method comprising: receiving from the system client the script representation of the behavior model.

3. A method according to claim 1, the method comprising processing control packets received at the data broker before receiving the deployment instruction in a first mode of operation in accordance with a predetermined default behavior.

4. A method according to claim 3, wherein the predetermined default behavior is compliant with a publish/subscribe messaging protocol.

5. A method according to claim 4, wherein the publish/subscribe messaging protocol is an MQTT protocol or an MQTT-SN protocol.

6. A method according to claim 1, wherein the behavior model is associated with a state machine.

7. A method according to claim 6, wherein the state of the state machine is updated, while the behavior model is in operation, in response to one or more of:
   a receipt of a control packet at the data broker system;
   an establishment of a connection with a publish/subscribe messaging client;
   publishing, by the data broker system, a message.

8. A method according to claim 6, wherein the state of the state machine represents one or more of:
   a connection status of a publish/subscribe messaging client;
   a counter value;
   a time value; and
   message content of one or more messages received.

9. A method according to claim 6, wherein when the behavior model is in operation, a published message received at the data broker system is processed in accordance with the behavior model, based on the state of the associated state machine.

10. A method according to claim 1, wherein the behavior model is associated with a scope defining characteristics of control packets which are to be processed in accordance with the behavior model.

11. A method according to claim 10, wherein the scope defines one or more of:
   a set of one or more publish/subscribe messaging clients; and
   a topic.

12. A method according to claim 10, wherein the scope is transmitted from the system client to the data broker system.

13. A method according to claim 10, the method comprising:
   after receiving the deployment instruction, receiving a control packet from a publish/subscribe messaging client,
   determining whether the control packet is within the scope of the behavior model, and
   in response to determining that the control packet is within the scope of the behavior model, processing the control packet in accordance with the behavior model.

14. A method according to claim 1, wherein the behavior model defines one or more of:
   processing to be applied to, or in response to, a control packet received from a publish/subscribe messaging client; and
   processing to be applied to control packets to be transmitted to a publish/subscribe messaging client.

15. A method according to claim 1, wherein processing a control packet received at the data broker received from the one or more publish/subscribe messaging clients in accordance with the behavior model comprises one or more of:
   discarding of a message received within the control packet;
generating and publishing a new message;
modification of the message received within the control packet;
   modification of a subscription or other state associated with a publish/subscribe messaging client;
   generating and transmission of a control packet to a publish/subscribe messaging client; and
   processing the control packet in accordance with the predetermined default behavior.

16. A data broker system, comprising
a network interface,
one or more memories, and
one or more processors,
   the one or more memories having stored thereon instructions, which when executed by the one or more processors, cause the data broker system to receive from a system client a deployment instruction instructing the data broker system to deploy a behavior model for modifying an operation of the data broker system, interpreting, at a run time, a script representation of the behavior model, and in response to receiving the deployment instruction, to process control packets received at the data broker system received from one or more publish/subscribe messaging clients in accordance with the behavior model.

17. A publish/subscribe messaging system, comprising
a data broker system, comprising
 a network interface,
 one or more memories, and
 one or more processors;
a client device, comprising
 a network interface,
 one or more memories, and
 one or more processors,
 the one or more memories of the client device having stored thereon instructions, which when executed by the one or more processors of the client device, cause the client device to implement a publish/subscribe messaging client; and
an apparatus, comprising
 a network interface,
 one or more memories, and
 one or more processors,
 the one or more memories of the apparatus having stored thereon instructions, which when executed by the one or more processors of the apparatus, cause the apparatus to transmit to the data broker system a deployment instruction to instruct the data broker system to deploy a behavior model for modifying an operation of the data broker system, the behavior model defining a manner of processing control packets received from the publish/subscribe messaging client at the data broker system; and
the one or more memories of the data broker system having stored thereon instructions, which when executed by the one or more processors of the data broker system, cause the data broker system to receive from the apparatus the deployment instruction instructing the data broker system to deploy the behavior model for modifying the operation of the data broker system,
interpreting, at a run time, a script representation of the behavior model, and in response to receiving the deployment instruction, to process control packets received at the data broker system, from the publish/subscribe messaging client, in accordance with the behavior model.

18. A method comprising:
establishing by a data broker system in a publish/subscribe messaging system, in accordance with a publish/subscribe messaging protocol, a respective connection with each of one or more publish/subscribe messaging clients, processing control packets received at the data broker in a first mode of operation in accordance with a predetermined default behavior, after the establishing, receiving at the data broker system from a system client a deployment instruction instructing the data broker system to deploy a behavior model for modifying an operation of the data broker system, and switching, in response to receiving the deployment instruction, to a second mode of operation in which the control packets received at the data broker are processed in accordance with the behavior model, wherein the switching from the first mode of operation to the second mode of operation is performed without modifying one or more of:
 a state or contents of a message buffer at the data broker system;
 an existing subscription of a publish/subscribe messaging client;
 a state of a connection with a publish/subscribe messaging client; and
 a state associated with a message being transmitted to, or received from a publish/subscribe messaging client.

19. A method according to claim 18, the method comprising:
interpreting, at a run time, a script representation of the behavior model.

20. A method according to claim 19, the method comprising:
receiving from the system client the script representation of the behavior model.

* * * * *